United States Patent [19]
Perego

[11] 3,740,100
[45] June 19, 1973

[54] DEVICE FOR QUICK FIXING OR DISMOUNTING RESPECTIVELY OF A WHEEL FROM THE SUPPORTING FRAME OF A VEHICLE, PARTICULARLY A PRAM OR PUSH-CHAIR FOR CHILDREN

[76] Inventor: Giuseppe Perego, Via De Gasperi 50, Arcore, Italy

[22] Filed: Apr. 8, 1971

[21] Appl. No.: 132,269

[30] Foreign Application Priority Data
Nov. 13, 1970  Italy .............................. 31725 A/70

[52] U.S. Cl. ................................................. 301/121
[51] Int. Cl. ............................................. B60b 27/02
[58] Field of Search ............................. 301/120, 121

[56] References Cited
UNITED STATES PATENTS
1,431,242  10/1922  Lindberg ............................ 301/121
1,567,638  12/1925  Dean .................................. 301/121

FOREIGN PATENTS OR APPLICATIONS
1,141,067  1/1969  Great Britain ..................... 301/121
1,184,976  2/1959  France ............................... 301/121

Primary Examiner—Richard J. Johnson
Attorney—John J. McGlew and Alfred E. Page

[57] ABSTRACT

A wheel mounting construction particularly for engaging a wheel of a child's toy on an axle of the toy to facilitate its positioning and rotatable mounting, comprises a wheel having a hub portion forming a sleeve which engages over the axle and is rotatable thereon. The sleeve is held against withdrawal by the resilient engagement of slot-separated segments on one end of the sleeve into a separate small size sleeve member which is retained within a slot of a guillotine plate. The guillotine plate is movably mounted on a bracket which is affixed to the frame of the vehicle and the axle of the vehicle extends through the slot of the plate. The slot is sized so that a wall-bounding smaller diameter portion of the slot engages upwardly within a recess of the holding sleeve for the wheel hub and it prevents its withdrawal. The plate may be moved against a spring-biasing force to position the small sleeve in a large diameter portion and thus free it so that it may be removed axially along with the associated wheel.

6 Claims, 5 Drawing Figures

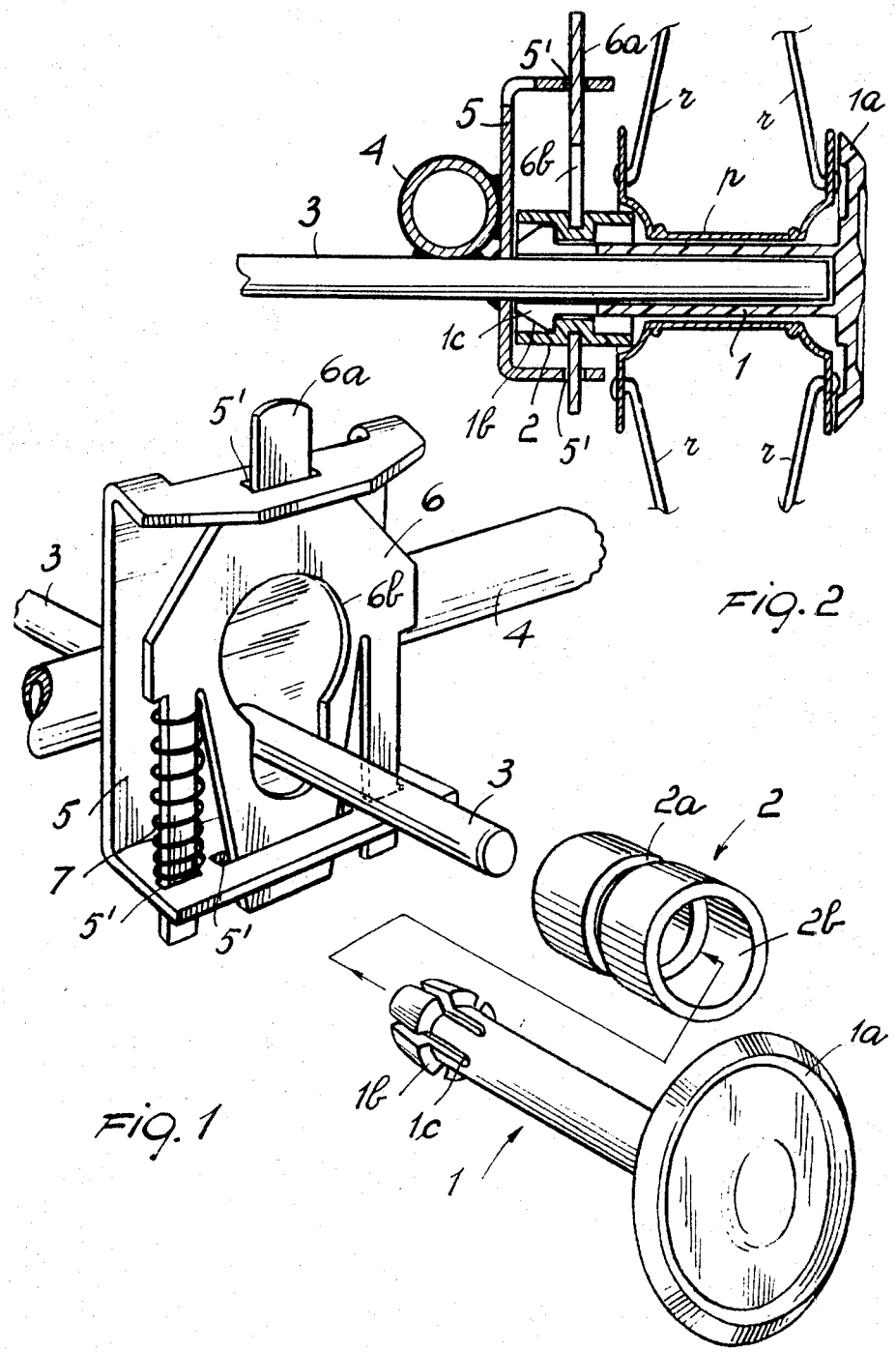

INVENTOR
GIUSEPPE PEREGO

BY McBlew & Tuttle
ATTORNEYS

:::page-number
1
:::

DEVICE FOR QUICK FIXING OR DISMOUNTING RESPECTIVELY OF A WHEEL FROM THE SUPPORTING FRAME OF A VEHICLE, PARTICULARLY A PRAM OR PUSH-CHAIR FOR CHILDREN

BACKGROUND OF THE INVENTION

FIELD OF THE INVENTION

This invention relates in general to the construction of devices for mounting wheel elements and, in particular, to a new and useful device for facilitating the easy mounting or demounting of a wheel which engages in a slot of a shiftable plate member.

SUMMARY OF THE INVENTION

It is the object of the present invention to provide a device for quick fixing or dismounting, respectively, of a wheel from the supporting frame of a vehicle, and particularly, from a pram or push-chair for children.

Said device is essentially comprised of two concentrical sleeves of a strong plastic material, the inner one of which is threadable in the hub of the wheel and can house the end of the axle pin, and a metal, guillotine stop, fixed to the frame of the pram and therefore outside the wheel itself.

The device object of the present invention is a considerable improvement over the prior art in that the guillotine stop is provided outside the wheel instead of being applied to it, the same as in the already known devices, and is adapted to act on a similar central recess provided on the cylindrical outer plastic sleeve used as a stop, instead of on a contrasting recess suitably provided on the metal pin of the axle.

The advantages derived therefrom are numerous:

1. First of all, since the application of the inner plastic sleeve in the hub of the wheel is itself immediate, the fixing of the wheel is much quicker than in the past;
2. Because the friction between the metal tab of the guillotine stop and the central recess of the second outer plastic sleeve is very limited, the wheel is more slidable;
3. Since, as already mentioned, the contrasting recess on the metal pin of the axle does not have to be provided and it is possible to replace the pair of plastic sleeves, if necessary, with very little expenditure, the cost is reduced.
4. In view of the foregoing, the life of the device is considerably longer.

The accompanying drawings show by way of example only, and without limitation, a preferred embodiment of the device according to the invention.

BRIEF DESCRIPTION OF THE DRAWINGS

In the Drawings:

FIG. 1 is an exploded perspective view of a device constructed in accordance with the invention with the various components dismounted;

FIG. 2 is a longitudinal sectional view of the device shown in FIG. 1;

DESCRIPTION OF THE PREFERRED EMBODIMENT

Figure 5:
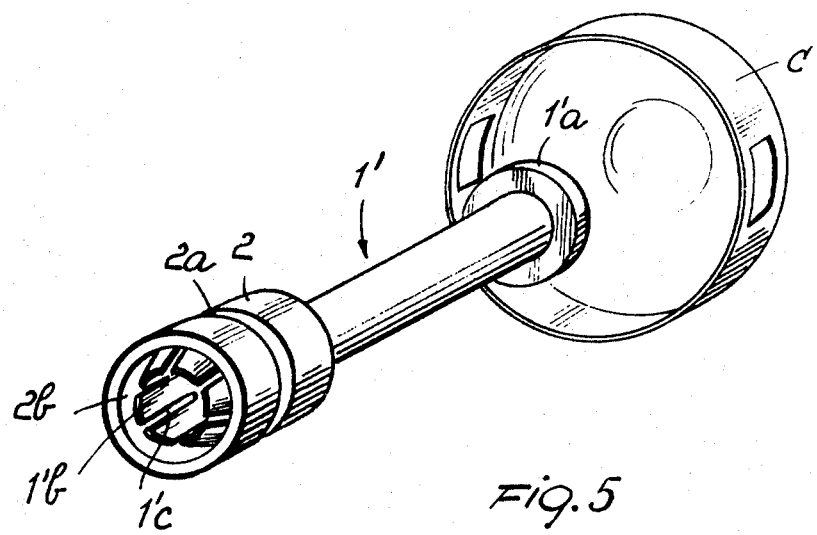
FIG. 5 is a perspective view of another embodiment of the two plastic sleeves.

As may be seen from the drawing, the device according to the invention, essentially comprises a plastic sleeve 1, engageable in the hub p of a wheel and within another plastic sleeve 2 which forms a stop. The sleeve 2 is engaged by a locking plate or guillotine piece 6 which is mounted for vertical movement in a bracket 5 fixed fast with the frame 4 and therefore to the pin or axle 3 of a toy vehicle or pram. The axle 3 extends into the hollow sleeve 1. The sleeve 1 may end at one extremity with a flat hub cover 1a (FIGS. 1 and 2) or with a lug acting as a stop 1'a (FIG. 5), in which case a metal hub cover C is used, while in another portion, e.g., at the other extremity, it has latching means, e.g., it ends with several segments or tabs 1b (six in the drawing) which are flexible and are separated by longitudinal slots 1c. Each tab 1b has a widened frusto-conical front surface. This shape of the tabs 1b allows them to come together and enter the hub p and the sleeve 2 and subsequently to spring apart and widen again behind a central shoulder at the interior of the sleeve 2. When engaged with the sleeve 2, the tabs 1b hold the axle 3 and form a shoulder, thus preventing the sleeve 2 from coming out. The sleeve 2 is provided with an external central peripheral recess which divides it into two small cylinders 2a, 2b.

The frame 4 is welded to the axle 3 and to a metal piece or bracket 5. The piece 5 is of a C-section form (FIGS. 1 and 2) and is provided with two limbs or legs having aligned slots or holes 5'. The upper hole 5' is used for passage of the upper smaller end 6a, of the guillotine plate 6. The plate has a central slot or hole 6b shaped like a keyhole. The lower holes 5' of the bracket 5 are used for the passage of the three forked ends or prongs provided at the bottom of piece 6. A spring 7 is provided around one of the prongs of the forked end and biases the plate 6 upwardly.

Figure 3:
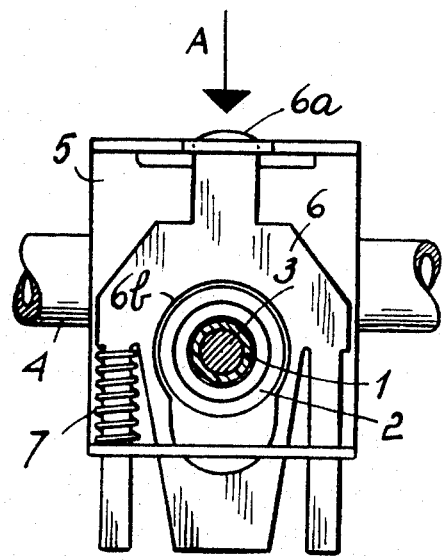
FIGS. 3 and 4 are transverse sectional views showing the metal stop in a fixed position and a rest position, respectively.
Figure 4:
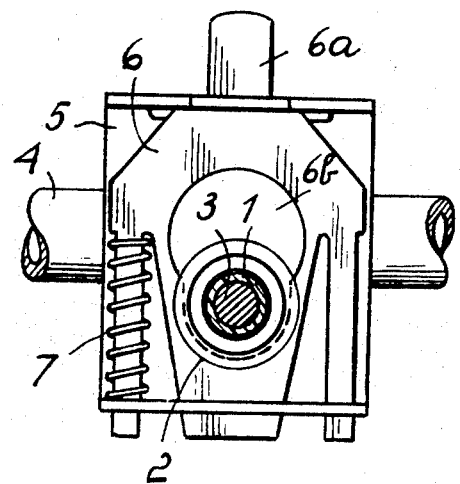

As may be clearly seen from FIGS. 3 and 4, in view of the shape of hole 6b, the piece 6 and the sleeve 2 are assembled together by pressing downwardly tab 6a, to cause the circular portion 6b of the hole to align with the sleeve 2 and permit entry thereof as the spring 7 is compressed. This downwardly position of the tab 6a also frees the sleeve when it is to be removed. The sleeve 2 engages into the small part of the slot 6b upon the release of the spring 7. When sleeve 2 enters the lower restricted portion of hole 6b, the plate 6 axially locks the sleeve 2 and thus the wheel, which consequently has the maximum slidability.

In FIG. 2, the spokes of the wheel are indicated with the symbol "R". In order to dismount the sleeves 1,2 from the hub p, just in case they have to be replaced, a small tube of suitable diameter may be used to spring the tabs 1b together to permit them to pass out of the sleeve 2 and the hub p. Generally speaking, however, this is not necessary because their resistance to wear is longer than the life of the pram itself.

I claim:

1. A wheel mounting construction for engaging a wheel on a mounting axle for rotation thereon, comprising a mounting bracket adapted to be secured in a fixed position adjacent said axle, a plate slidably carried by said bracket and having a slot oriented so that the axle extends through the slot, a wheel having hub means associated therewith engageable over the axle for rotation on the axle and extending into said slot, and biasing means for biasing said plate to cause the plate to engage the hub means and prevent axial withdrawal thereof, said plate being movable against said biasing means to move it out of engagement with said hub means and permit said hub means to be withdrawn axially off said axle, said hub means including a wheel sleeve portion having an end with a plurality of circumferentially spaced segmental portions each separated by a longitudinally extending slot, said segmental portions being springable together, said frame having a wheel mounting portion with a through opening through which said wheel sleeve portion extends, and an engagement sleeve fitted over the segmental end of said wheel sleeve portion and having a recess engageable in the wall bounding the slot of said plate.

2. A device according to claim 1, wherein said segmental portions include portions projecting outwardly from the periphery of said wheel sleeve portion, said engagement sleeve having an inwardly extending portion at the interior thereof engaging behind the projecting portions of said segmental portions.

3. A wheel mounting construction for engaging a wheel on a mounting axle, comprising a vehicle frame having a wheel axle, a mounting bracket secured to said frame nd having spaced apart top and bottom leg portions with at least one slot therein and secured adjacent the axle so that the axle extends between the top and bottom leg portions, a guillotine plate having a tab portion extending through the slot of the top leg portion and the slot of said bottom leg portion of said bracket and being slidable upwardly and downwardly in respect to said bracket, said guillotine plate having a keyhole shaped plate slot through which said axle extends with a large diameter upper portion and a smaller diameter lower portion connecting into said large diameter upper portion, a wheel having a hub sleeve portion engageable over the axle for rotatably supporting the wheel on the axle, a securement sleeve having a recess on its outer periphery locatable within the smaller diameter portion of the slot of said guillotine plate and engaged over said sleeve hub portion at a fixed axial location, and biasing means biasing said plate in a direction to cause engagement of said recess of said engagement sleeve member in the smaller diameter slot portion of the guillotine plate, said guillotine plate being movable against said biasing means to position the sleeve in the larger diameter portion of said slot and to free said sleeve with said plate for axial movement along the axle.

4. A device according to claim 3, wherein said biasing means comprises a coil spring, said guillotine plate having a bottom portion with a bottom tab extending through a slot of said bottom leg portion of said bracket, said spring being coiled around said bottom top and biasing said plate portion upwardly to position the small diameter slot into engagement with the sleeve.

5. A wheel mounting base according to claim 3, wherein said wheel hub sleeve member has an end with a plurality of circumferentially separated segments which may be biased together to permit entry of said hub sleeve member into said securement sleeve, said segments being expandable to engage behind said securement sleeve to anchor said securement against axial withdrawal from said hub sleeve member, said guillotine plate having a top portion forming a tab extending upwardly through the slot of said top leg member which is in a position to be depressed downwardly for positioning said plate member with the large diameter portion surrounding said securement sleeve in a position at which said securement sleeve is free of said guillotine plate and may be withdrawn with said hub sleeve.

6. A wheel mounting construction for engaging a wheel on a mounting axle for rotation thereon, comprising a mounting bracket adapted to be secured in a fixed position adjacent said axle, a plate slidably carried by said bracket and having a slot oriented so that the axle extends through the slot, a wheel having hub means associated therewith engageable over the axle for rotation on the axle and extending into said slot, and biasing means for biasing said plate to cause the plate to engage the hub means and prevent axial withdrawal thereof, said plate being movable against said biasing means to move it out of engagement with said hub means and permit said hub means to be withdrawn axially off said axle, said hub means including a wheel hub sleeve portion extending axially into said slot, an engagement sleeve fitted over said wheel hub sleeve portion and having a peripheral recess into which the wall portion bounding the slot in said plate is engageable, said wheel hub sleeve and said engagement sleeve having interengageable latch means for securing said wheel hub sleeve against axial withdrawal from said engagement sleeve.

* * * * *